United States Patent Office 2,935,540
Patented May 3, 1960

2,935,540

PURIFICATION OF ISOPRENE

John S. B. Wolfe, Rocky River, Ohio, assignor to Goodrich-Gulf Chemicals, Inc., Cleveland, Ohio, a corporation of Delaware No Drawing. Application April 22, 1957
Serial No. 654,063

2 Claims. (Cl. 260—681.5)

This invention relates to the purification of isoprene. More particularly, it is concerned with the purification of commercially-available crude isoprene to produce products of a sufficiently high order of purity as to be polymerizable in good yields by the new, structurally-specific types of catalysts.

In the copending application of Samuel E. Horne, Jr., Serial No. 472,786, filed December 2, 1954, there is disclosed a heavy metal organo-metallic catalyst for converting isoprene to an all-cis-1,4 (head-to-tail) polyisoprene resembling natural (Hevea) rubber in structure and in many of its properties. Likewise, in the copending application of C. F. Gibbs et al., Serial No. 503,027, filed April 21, 1955, the production of an essentially all-trans-1,4 head-to-tail polyisoprene resembling balata is described using catalysts similar to that of the above-mentioned Horne application. Further, in the copending application of Hugh E. Diem et al., Serial No. 557,826, filed January 9, 1956, now U.S. Patent No. 2,913,444, there is disclosed an alkyl lithium catalyst for producing a high cis-1,4 polyisoprene. In any of these processes, commercially-available isoprenes function as if they contain varying amounts of inhibitors or retarders of polymerization.

Crude or commercial isoprenes obtained from hydrocarbon conversion processes, for example, the cracking or dehydrogenation of hydrocarbons, are found to contain as inhibiting substances, straight chain acetylenes such as 2-butyne and 1-pentyne, and alpha-acetylenes such as isopropyl acetylene and isopropenyl acetylene. Some commercial isoprenes also contain cyclopentadiene-1,3 which, strangely enough, is among the most potent inhibitors of the polymerization of isoprene. Of these impurities or inhibitors, 2-butyne seems to be present in the largest proportion, often being present to the extent of as much as 3 or 4 mol percent. The alpha-acetylenes may be present in proportions up to about 1 wt. percent and cyclopentadiene-1,3 up to about 0.5 to 0.7 wt. percent.

There have been many methods proposed for treating isoprene and similar monomers to remove the above and other impurities. For example, isoprene can be treated with maleic anhydride to remove cyclopentadiene-1,3. It has also been proposed to treat isoprene with metallic sodium to effect a reduction in total inhibitors. However, no single treatment of this type, nor any combination of these treatments, has been found capable of producing an isoprene satisfactory in the above-mentioned polymerization processes which require total inhibitors less than about 0.1% for best results.

In the copending application of Alfred M. Henke et al., Serial No. 631,230, filed December 28, 1956, now U.S. Patent 2,900,430, it has been proposed to treat isoprene with 5 Angstrom "molecular sieves" to effect a reduction in the straight chain acetylene content. Such a process is highly selective and removes the 2-butyne constituent without otherwise significant change in the proportion of the other acetylenic hydrocarbon inhibitors or other inhibitory impurities. The "molecular sieves" have to be regenerated when they have become saturated, and this occurs effectively when the sieves have absorbed about 10 to 15% of their weight of 2-butyne. While the sieves can be regenerated, such a process step is costly. Moreover, there is a limit to the number of regeneration cycles which they can withstand without impairment of their absorptivity or destruction of their physical form.

In accordance with the present invention, however, "polymerization grade" isoprene is produced at a reduced cost by subjecting a crude, impure isoprene derived from hydrocarbon conversion processes to a sequence of operations, including first, treating the crude, impure isoprene with metallic sodium in the form of a finely-divided, or colloidal, dispersion in a hydrocarbon medium and second, treating the resulting sodium-treated isoprene with "molecular sieves" having a channel diameter of about 5 Angstrom units. The finely-divided metallic sodium reacts quite readily with a number of inhibitory substances likely to be present in isoprene, particularly with the alpha-acetylenes such as isopropenyl acetylene. While it has been found that authentic (pure) 2-butyne does not react with metallic sodium, an efficient treatment of isoprene with finely-divided metallic sodium generally seems to effect an appreciable reduction in the "apparent" 2-butyne content. The term "apparent 2-butyne content" is used herein to designate that portion of a crude isoprene which shows up as the 2-butyne "peak" upon analysis with the Fisher-Gulf partitioner employing a tricresyl phosphate column at 50° C. Apparently, the partitioner "peak" covers at least two compounds, one of which is 2-butyene (which is not reactive with metallic sodium) and the other, an unknown substance, which is reactive with metallic sodium. The treatment with finely-divided or dispersed sodium also effects a reduction in other inhibitory impurities such as cyclopentadiene; oxygen present in peroxides; and in the amount of water, phenols and phenolic inhibitors, alcohols, and the like. The two-stage process of this invention produces isoprene of a high degree of polymerizability. By this procedure the total inhibitors of stereo-specific polymerization can be reduced to a relatively harmless level (i.e. less than about 0.1% by weight).

The sodium treatment indicated above is conducted in such a manner as to prevent any substantial amount of polymer formation (sodium normally is a polymerization catalyst for isoprene). The latter is accomplished in any of a number of ways including (1) short contact time; (2) reduced concentration of sodium metal; and (3) keeping the temperature below about 30 to 40° C. when the sodium concentration and time of contact would otherwise favor polymerization. It is possible to bubble isoprene vapor through molten sodium metal at about 100° C. without substantial polymerization because of the extremely short contact time. It is preferred to utilize only sufficient metallic sodium to insure reaction with the full amount of sodium-reactive impurities, any excess being limited (in the usual case of appreciable contact times) to not more than about a 75% excess over the theoretical sodium requirement. To further facilitate the reaction and drive the reaction to completion, the sodium should be as finely divided as possible. Preferred is a fine sodium metal dispersion which is colloidal in nature, the continuous phase being a hydrocarbon such as petrolatum or petrolatum/mineral oil mixtures. The latter are made by melting sodium and the petrolatum and combining (under an inert atmosphere such as helium) the resulting melts under conditions of vigorous agitation. Another form of sodium which can be utilized is made by coating dry $Na_2CO_3$ with molten sodium and then cooling. Such products should be stored under helium to prevent reaction with oxygen and moisture of the air.

It is necessary to carry out the sodium treatment under an inert atmosphere, not only to prevent reaction of moisture and oxygen with the high-reactive sodium but also to prevent pick-up of these impurities by the isoprene. The time of contact between the sodium metal and the isoprene is not critical, only that time being required as is necessary to accomplish efficient and thorough contact of the sodium with the entire body of isoprene. Usually, a contact time of one or two hours is entirely adequate in batch-style reactions.

Following the mingling with the sodium, the isoprene is preferably filtered, centrifuged, and/or distilled to accomplish a clean separation between the isoprene, on the one hand, and the unreacted sodium metal and the reaction products, on the other hand. Once freed of the sodium metal and its reaction products, the treated isoprene is ready for removal of the 2-butyne type ingredient, the second stage "sieve" treatment.

However, at this point it has been found highly desirable to subject the isoprene to a distillation wherein only about 10 to about 20% of the isoprene is taken off overhead under reflux, the overhead being found to be relatively richer in 2-butyne than the pot material. The condensate can be recycled or treated by other methods to separate the isoprene from the 2-butyne. In some cases, the condensate may contain up to 50% of the 2-butyne content of the sodium-treated isoprene. The total reduction in the over-all "apparent" 2-butyne content can be as much as 75% and the useful life of the sieves will be more than doubled. When sodium-treated and distilled isoprene is treated with "sieves," and then stored under a dry, inert atmosphere, it will be found to contain less than 0.1% by weight of inhibitory substances.

As is known in the art, "molecular sieves" are crystalline dehydrated zeolites, natural or synthetic, having a well-defined physical structure. Chemically the zeolites are hydrous aluminum silicates, generally containing one or more sodium, potassium, calcium, strontium or barium cations, although zeolites containing hydrogen, ammonium or other metal cations are also known. These zeolites have a characteristic three-dimensional aluminum silicate anionic network, the cations neutralizing the anionic charge. Upon dehydration, the three-dimensional lattice network of the crystal is maintained, leaving interconnecting channels, pores, or interstices of molecular dimensions within the crystal lattice. The cross-sectional diameter of such channels can vary, dehydrated three-dimensional zeolites having channels with cross-sectional diameter of 4, 5 or 6 Angstrom units being known.

For each of the zeolites of this type, the narrowest cross-sectional diameter of the channels is characteristic and is substantially uniform and fixed throughout the crystal. Thus, materials are available having channel diameters of substantially all 4 Angstrom units, substantially all 5 Angstrom units, or substantially all 6 Angstrom units, as the case may be. It is customary, therefore, to characterize certain molecular sieves found useful in this invention as 5 Angstrom unit molecular sieves. It is a characteristic feature of this invention that the selective absorption of straight-chain acetylenes from isoprene containing them takes place only with 5 Angstrom molecular sieves. Thus, 2-butyne, for example, cannot be separated from isoprene when using either 4 Angstrom or 6 Angstrom molecular sieves.

The contact between the sodium-treated (or sodium-treated/distilled isoprene) and the 5 Angstrom sieves can be effected in many ways. For example, the isoprene can be in either the liquid or vapor state when contacted with the molecular sieves. In either case, the straight-chain acetylenic inhibitors, and particularly 2-butyne, are effectively removed. Since the removal of these acetylenic inhibitors is an adsorption process, the process takes place under normal ambient temperatures and pressures, particularly when the isoprene is in the liquid form. However, temperatures ranging from about −20 to about 150° F. and pressures ranging from about 1 to about 250 pounds per square inch absolute can be employed. Higher temperatures and pressures than those given are not preferred because of the possibility that the isoprene may polymerize. Isoprene has a boiling point of 93.4° F. (34.1° C.) and it is possible that even at room temperatures there may be isoprene vapor present when conducting a liquid phase contact process. Superatmospheric pressures of, for example, up to about 250 pounds per square inch absolute, can be employed to prevent vaporization at ordinary temperatures. Where an entirely vapor phase contact is desired, the contact temperature can be increased to about 100° F. or the pressure obtaining can be reduced to induce vaporization of the impure isoprene at temperatures below its normal boiling point.

The actual physical particle size (i.e. the state of subdivision) of the molecular sieves is not critical. Successful results can be obtained with molecular sieve powders having an average particle size of from 0.5 to 5 microns, as well as with pellets having diameters of ⅛ and ¹⁄₁₆ inch. Thus, in small operations, isoprene can be stirred with the powdered type of 5 Angstrom molecular sieves, for example, in the proportions of from about 200 to about 400 grams of molecular sieves per gram mol of straight-chain acetylene (2-butyne) content, the mixture allowed to settle and an isoprene substantially free of 2-butyne decanted off. For larger scale operations, wherein it is the intention to reclaim or regenerate the sieves, it is preferred to employ the pellet-style molecular sieves in an adsorption column style of operation, the pellet-style sieves being more convenient to handle and assuring proper flow of isoprene through beds of the sieves.

For example, a column or vessel packed with a fixed bed or layer of sieves can be utilized and the isoprene passed through the fixed bed in either upflow or downflow direction. Likewise, moving beds of the sieves can be utilized. In the latter method, isoprene is passed upwardly through a downwardly moving bed of sieves; spent or saturated sieves are removed from the bottom of the bed, regenerated and recycled to the top of the downwardly moving bed, and purified isoprene is removed from the top of the adsorption zone. Fixed bed operation can be made more or less continuous in nature by providing two or more beds of sieves, one of which is on stream while another is being regenerated.

While the contact time, per se, is not critical, in flow-type processes of either fixed or moving bed types, certain contact times usually are required and these will vary depending upon such factors as the type of contact (i.e. liquid or vapor phase contact) and the like. In such processes the contact time can be expressed most conveniently as liquid hourly space velocities, values of which from about 0.3 to 20 volumes of impure isoprene per volume of molecular sieves per hour can be employed. With fixed bed operation, space velocities of from about 0.3 to 8 are preferred.

The total through-put of impure isoprene before the molecular sieves become "spent" will vary considerably, depending principally on the 2-butyne content of the isoprene. In general, when the molecular sieves have absorbed from about 6 to 9 or 10% by weight of acetylenic materials, their absorptive capacity is markedly reduced and they may be considered saturated. When this occurs, the sieves may be regenerated by burning off, under closely controlled conditions, the adsorbed hydrocarbons with an oxygen-containing gas at a temperature controlled rather closely in the range of about 900° to 1100° F. Regeneration by desorption techniques such as hot purge gases, steaming, evacuation, or otherwise employing elevated temperatures involves the risk of fouling of the sieves due to the polymerization of the adsorbed unsaturated hydrocarbons.

Regeneration of molecular sieves is best accomplished by first draining off of liquid isoprene and then evacuating the container to draw off as much residual isoprene as possible. A mixture of gas such as air or nitrogen (or combustion gases) with a carefully controlled amount of oxygen is preheated and then passed into the sieves, the gas mixture being initially at least, preheated to a temperature sufficient to initiate combustion. Since excessive combustion temperatures tend to destroy the physical structure of the sieves, it is preferred to maintain a combustion temperature not in excess of about 1100° F. For example, nitrogen or recycle combustion gases can be mixed with air in order to limit the amount of oxygen available for combustion. It is thus possible to maintain the combustion temperature within the range of about 900 to about 1100° F. Temperatures below about 900° F. do not completely remove the adsorbed hydrocarbons. Good results are obtained in the range of 900° to 950° F. After the burnoff, the sieves are purged of residual combustion gases and finally cooled to room temperature while carefully protected by a dry gas such as nitrogen. The sieves can then be utilized again for removal of acetylenic impurities such as 2-butyne. The sieves retain their efficiency even after repeated cycles of regeneration.

Since molecular sieves adsorb water in preference to all other substances, thereby impairing their capacity for acetylenic materials, it is desirable to guard against the adsorption of water. To this end, the sieves are handled (when charging to the apparatus) under a dry atmosphere and, to insure their completely anhydrous condition, they may be preheated to about 250° to 650° F. just prior to contact with the isoprene in the adsorption step. Also, to avoid premature deactivation of the molecular sieves, it is desirable, if the isoprene has been exposed to moisture, to dehydrate the isoprene prior to contacting the 5 Angstrom molecular sieves. For the latter purpose, activated alumina, silica gel, or molecular sieves (any channel diameter) can be utilized. However, if the isoprene is protected by a dry gas atmosphere after the first stage-sodium treatment, the isoprene will be in a properly anhydrous condition for contact with the sieves. In the regeneration of the sieves, it is best to purge the freshly burnt-off sieves of residual combustion gases before the sieves are cooled, thereby to guard against condensation of any water of combustion in the sieves. Pickup of moisture can be guarded against during cooling or while on stand-by by maintaining an atmosphere of dry gas over the sieves. If a stream of cooling gas is employed after regeneration, the gas should be desiccated before contact with the sieves.

Of course, to protect the purity of the sodium- and sieve-treated isoprene, it should be stored under an inert atmosphere to prevent pickup of moisture and oxygen during storage. In any case, the isoprene will be sufficiently pure, if just before use in polymerization, it is topped to the extent of about 5%. Such a procedure will ensure polymerization at maximum rates. The small amount of overhead material can be recycled to either stage of the above purification process.

The invention will now be described in connection with several specific examples, which are intended as being illustrative only.

*Example I*

In this and in Example II, the starting isoprene utilized is a petroleum-derived 95% commercial product having the following inhibitor analysis:

Alpha-acetylenes _____ 0.31 wt. percent.
Cyclopentadiene _____ 0.29 wt. percent.
2-butyne _____ 3.58 mol percent.
Tertiary butyl catechol [1] _____ 0.05 wt. percent.

[1] An inhibitor added by the manufacturer.

In the above analysis, the alpha-acetylenes are determined by titration with alcoholic $AgNO_3$ solution; the cyclopentadiene is determined colorimetrically; and the 2-butyne content is determined by use of the Fisher-Gulf Gas partitioner employing a TCP column at 50° C.

In this and subsequent examples, a sodium metal dispersion in a 60/40 mineral oil/petrolatum mixture is employed. The dispersion contains about 25.6% by weight of sodium in the form of particles which range from 1 to 10 microns in diameter. Such a dispersion is made by melting petrolatum, adding mineral oil and linseed oil dispersant and then combining the resultant melt with melted sodium under a dry nitrogen-atmosphere while vigorously agitating the mix. The materials utilized are as follows:

"Kaydol" petrolatum _____ lbs__ 6
"Fonoline" white mineral oil _____ lbs__ 9
Boiled linseed oil (dispersant) _____ grams__ 23
Sodium metal _____ lbs__ 5

In this example, a 12 liter glass laboratory flask is washed, dried and purged with dry nitrogen. A stirrer and a 6-pronged sintered-glass filtering rod are provided as accessories. Into the nitrogen-filled flask there are charged 4875 grams of the above-described raw isoprene. In this experiment it is decided to employ an excess of sodium metal of about 40% over that required, theoretically, to react with the above-indicated amount of alpha-acetylene and cyclopentadiene. Accordingly, 31.5 grams of metallic sodium are added to the flask (Ca. 126 grams of the above-described sodium dispersion). The contents of the flask, under a nitrogen atmosphere, then is agitated gently at room temperature (25° C.) for two hours. To follow the course of the reaction, samples of the isoprene are taken for analysis at 0.5, 1.5 and at 2.0 hours. The isoprene is then drawn off through the filter rod into another dry, nitrogen-filled flask for the sieve-treatment. Analysis of the samples shows the following:

| Sample | Percent Alpha-Acetylene |
| --- | --- |
| 0.5 hr_____ wt. percent__ | 0.15 |
| 1.5 hr_____ do___ | 0.036 |
| 2.0 hr. (final)_____ do___ | 0.025 |
| 2-Butyne Content (Final)_____ mol percent__ | 2.86 |
| 2-Butyne Content (Initial)_____ do___ | 3.58 |
| Cyclopentadiene (Final)_____ wt. percent__ | 0.0 |

As will be seen the above sodium treatment reduced the alpha-acetylene content to 0.025 wt. percent. Unexpectedly, the 2-butyne content is reduced from 3.58 mol percent to 2.86 mol percent.

The resultant sodium-treated isoprene, in amount 4218 grams, is combined with 844 grams of powdered, anhydrous 5 Angstrom molecular sieves (384 grams of sieves/mol of 2-butyne to be removed). The nitrogen flow over the mixture is maintained for 2 hours while gently agitating. During this time the reaction mixture is at 26° C. After 2 hours of agitation the isoprene is filtered off (through a filter rod) into a dry, nitrogen-filled still pot. The product is then flash distilled. Analysis of the flash distilled product reveals the following:

Alpha-acetylenes _____ 0.025 wt. percent.
2-butyne _____ <0.1 mol percent.
Cyclopentadiene _____ 0.

The flash-distilled product is tested for its reaction rate in a standard polymerization in which a "pure grade" isoprene (Phillips Petroleum Co. "pure grade" isoprene) and the original impure isoprene are employed as references or controls. Each polymerization is carried out in a one-quart glass beverage bottle, the bottle being sealed and clamped in a rack rotating in a water bath. Each bottle is charged under a flow of dry nitrogen with about 40 grams of one of the above isoprenes, about 500 ml. of benzene, and about 7 millimoles per liter of triisobutyl aluminum and about 6 millimoles per liter of titanium tetrachloride. At the end of about 15 hours of reaction, the bottles are found to contain viscous, dark brown colored cements. The cements are treated with methanol to precipitate the dissolved polymer, the polymer washed with methanol and dried. The yield of polymer obtained in each case is as follows:

| Charged | Percent Wt. Yield (percent Conversion) |
|---|---|
| (1) Original Impure Isoprene | 0-10% in 15 hrs. |
| (2) Purified Isoprene of Example I | 95-100% in 15 hrs. |
| (3) "Pure Grade" Isoprene | 95-100% in 15 hrs. |

*Example II*

In this example, the procedure of Example I is repeated except that the sodium charge factor is 1.67 (i.e. a 67% excess) instead of 1.40. In spite of the increased proportion of sodium no polymerization is noted. The isoprene, following 2 hours of reaction with the sodium dispersion at 25° C. has the following analysis:

Alpha-acetylene _____ 0.006 wt. percent.
2-butyne _____ 2.85 mol percent.
Cyclopentadiene _____ None.

The increased proportion of sodium has reduced the alpha-acetylene content below 0.01%. Again, it should be noted that the 2-butyne content has been reduced to 2.85 mol percent from an original value of 3.58 mol percent.

After the above sodium-treated isoprene is treated with 5 Angstrom molecular sieves, according to the procedure of Example I, the analysis of the isoprene is as follows:

Alpha-acetylene _____ 0.006 wt. percent.
2-butyne _____ <0.1 mol percent.
Cyclopentadiene _____ None.
Total acetylenic inhibitors ____ Less than 0.10 wt. percent.

The resulting isoprene is stabilized by addition of 0.05 wt. percent of tertiary butyl catechol and stored under dry nitrogen until required for polymerization. This isoprene polymerizes with even greater facility than does the isoprene of Example I.

*Example III*

In this example, a larger quantity of isoprene is purified by a process consisting of the steps: (1) sodium treatment using the sodium dispersion of Example I and (2) treatment with 5 Angstrom molecular sieves in a packed column (fixed bed). In this experiment the reactor utilized in the sodium treatment is a 1000 gallon reactor equipped with a distillation column. First, the pot is evacuated while heating same at 30° C. for 2 hours. After cooling to room temperature while filled with dry nitrogen (15 p.s.i. gage), 3,486 lbs. of impure isoprene is pumped in. To this charge there are added 10.61 lbs. of metallic sodium (added in the form of the same dispersion used in Example I). The resulting mixture is gently agitated for one hour and 40 minutes at 23–25° C. The charge is then filtered and samples withdrawn for analysis. The before-and-after analyses are as follows:

| Alpha-Acetylenes | | 2-Butyne | | Cyclopentadiene | |
|---|---|---|---|---|---|
| Before Na, wt. percent | After Na, wt. percent | Before Na, mol percent | After Na, mol percent | Before Na, wt. percent | After Na, wt. percent |
| 0.28 | 0.04 | 3.1 | 2.54 | 0.20 | <0.10 |

This sodium treated isoprene is passed downwardly through a column packed with 305 lbs. of 5 Angstrom molecular sieves. A total of 1,588 lbs. of isoprene containing a total of 30.2 lbs. of 2-butyne produces a final percolate averaging 0.2 mol percent of 2-butyne. At this point the molecular sieves have absorbed 10% of their weight of 2-butyne and obviously require regeneration. After regeneration of the sieves, the isoprene containing 0.2 mol percent of 2-butyne is again passed through the column. After the second pass the 2-butyne content is well below 0.1%.

*Example IV*

The procedure of Example III is repeated except that after the filtration step (following the sodium treatment) the isoprene (containing ca. 1.25 wt. percent 2-butyne) is transferred to a distillation vessel. Distillation is commenced under a 10:1 reflux ratio taking off between 10 and 20% by volume of the charge. The pot residue (isoprene) is found to contain only 0.75 mol percent or 0.59 wt. percent of 2-butyne, this being a reduction of 53% in the 2-butyne content. At this point the "apparent 2-butyne" content has been reduced in two stages, for an over-all reduction of 60%. When such isoprene is passed through the sieve column of Example III, approximately 2.5 times the weight of isoprene can be treated before the sieves require regeneration.

*Example V*

The procedure of Example III is repeated except that the sieve treatment is carried out using a fixed bed column with the isoprene being passed up the column in the form of vapor. While this vapor style of sieve treatment is slower (i.e. requires a larger column) than liquid phase adsorptions, the 2-butyne content is very effectively removed.

I claim:

1. A process for preparing a polymerization grade isoprene containing less than 0.1%/wt. of total polymerization retarding impurities from a crude isoprene derived from the cracking of petroleum and including, as impurities, alpha-acetylenes and 2-butyne which comprises the stepwise treatment, carried out in the order given below and under an inert atmosphere, of (1) mixing the said crude isoprene with an excess of sodium metal in the form of colloidal particles from 1 to 10 microns in diameter, said excess of sodium metal being not greater than 75% more than the amount required to react with the said alpha-acetylenes in said crude isoprene, (2) agitating the resulting mixture, at a temperature below 40° C. until the said colloidal particles of sodium have reacted with the said alpha-acetylenes, (3) filtering the said colloidal sodium particles from the remaining isoprene, and (4) contacting the resulting sodium-treated isoprene with molecular sieves having a channel diameter of 5 Angstrom units to produce isoprene containing less than about 0.1%/wt. of total polymerization retarding impurities.

2. The process of claim 1 wherein the said sodium-treated isoprene is distilled under reflux to the extent of removing as overhead from about 5 to about 20% of the total sodium-treated isoprene before the latter is brought into contact with said molecular sieves.

References Cited in the file of this patent

UNITED STATES PATENTS 2,398,973    Soday _____ Apr. 23, 1946

OTHER REFERENCES

Barrer: Journal of Society of Chemistry and Industry, May 1945, vol. 64, pp. 130–135.

Linde: Chemical and Engineering News, Nov. 29, 1954, vol. 32, page 4786.